(12) United States Patent
Essenwanger

(10) Patent No.: US 6,774,832 B1
(45) Date of Patent: Aug. 10, 2004

(54) MULTI-BIT OUTPUT DDS WITH REAL TIME DELTA SIGMA MODULATION LOOK UP FROM MEMORY

(75) Inventor: Kenneth Alan Essenwanger, Walnut, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/396,918

(22) Filed: Mar. 25, 2003

(51) Int. Cl.[7] .............................................. H03M 3/00
(52) U.S. Cl. ..................................... 341/143; 341/144
(58) Field of Search .................................. 341/143, 144

(56) References Cited

U.S. PATENT DOCUMENTS

| | | | | |
|---|---|---|---|---|
| RE32,862 E | * | 2/1989 | Wachi | 84/693 |
| 5,081,603 A | * | 1/1992 | Mikos | 708/271 |
| 5,886,752 A | * | 3/1999 | Cross | 348/724 |
| 6,218,977 B1 | * | 4/2001 | Friend et al. | 341/163 |
| 6,344,812 B1 | * | 2/2002 | Takeda et al. | 341/143 |
| 6,380,874 B1 | * | 4/2002 | Knudsen | 341/118 |
| 6,384,761 B1 | * | 5/2002 | Melanson | 341/143 |
| 6,518,802 B1 | * | 2/2003 | Tu et al. | 327/106 |

\* cited by examiner

*Primary Examiner*—Peguy JeanPierre
(74) *Attorney, Agent, or Firm*—Leonard A. Alkov

(57) ABSTRACT

A direct digital synthesizer (DDS) generates a sinusoidal waveform having a variable frequency within a time duration. The DDS has a memory for storing pre-computed digital values defining the sinusoidal waveform, a barrel shifter for reading the contents of the memory and for presenting the digital values from the memory to a multiplexer at a first rate determined by a first clock. The multiplexer is connected to a Digital to Analog converter. The Digital to Analog converter converts the digital values presented by the multiplexer to the analog output at a second rate determined by a second clock. The barrel shifter shifts the digital values using a plurality of pipelines and n-bit wrap-around registers. Pre-computed digital values defining the sinusoidal waveform are stored within a memory, then routed using a bus exchange switch to the barrel shifter.

9 Claims, 8 Drawing Sheets

MULTI-BIT OUTPUT DDS WITH REAL TIME DELTA SIGMA MODULATION LOOK UP FROM MEMORY

FIELD OF INVENTION

This invention is in the field of direct digital signal synthesizers generating periodic signals at microwave frequencies.

DESCRIPTION OF THE RELATED ART

Direct digital synthesizers (DDS) use a plurality of digital data processing blocks to generate a frequency and phase tunable output referenced to a fixed frequency clock source. Generally, the fixed frequency clock source is divided down within the DDS architecture by a scaling factor specified using a digital tuning word. This digital tuning word is typically 24 to 48 bits long, allowing a wide degree of tuning resolution with respect to the fixed frequency clock source.

Another aspect of DDS operation is that in addition to the output frequency, the phase of the output can also be specified using a digital input. Thus, the parameters of the output from a DDS is not only frequency, but also phase, referenced to the clock source.

Typical DDS structures can generate an output signal specified in terms of both frequency and phase upon digital command for applications such as local oscillators quadrature (I/Q) synthesizers, GMSK and ramped FSK, and the like.

It is desirable to make frequency/phase changes quickly, even within one cycle of the waveform. In general, the constraints precluding high output frequency or rapid phase change come from various device limitations. One example of a device limitation is that the clock source frequency required for fast, sub-cycle change may be too high for devices created using existing semiconductor processes. Currently, high speed operation requires that the digital circuitry generating the output waveform switch at full clock speed frequencies. Such high speed operation uses substantial amounts of power, as well as imposing the need for high quality transistors having high frequency operating capability (high unity current gain transition frequency, $f_T$). High power consumption, coupled to high cost process for high $f_T$, structures, burdens state of the art systems with disadvantageous economic constraints.

Some configurations require the use of high speed random access memories to store digital bits required for conversion. Reducing the speed of these memories is an objective of the invention.

SUMMARY OF THE INVENTION

A direct digital synthesizer (DDS) is described for generating an analog output. The analog output is a sinusoidal waveform having a a variable frequency within a time duration.

The DDS comprises:

a memory (402, 404, 406, 335) for storing pre-computed digital values defining said sinusoidal waveform;

a barrel shifter (311, 408, 410, 412) for reading contents of said memory (402, 404, 406, 335) for presenting said digital values from said memory to an input of a multiplexer (321, 323, 325, 327, 416, 418, 420) at a first rate determined by a a first clock (434, 333).

The multiplexer (416, 418, 420) has an output connected to a Digital to Analog converter (329, 432). The Digital to Analog converter converts the digital values presented by the multiplexer (416, 418, 420) to the analog output at a second rate determined by a second clock (331).

The barrel shifter shifts the digital values using a plurality of pipelines and n-bit wrap-around registers (436).

The pre-computed digital values defining said sinusoidal waveform are pre-computed and stored within a storage means (memory) during said duration. Some of said pre-computed digital values are pre-computed using a numerically controlled oscillator (315). Others of said pre-computed digital values are pre-computed using a simulation of a $\Delta\Sigma$ modulator (337).

Pre-computed digital values are routed from a storage means (335) using a bus exchange switch (309) to the barrel shifter (311). Other values are computed within NCO 315, routed through Bus exchange switch 309 to either a storage location (RAM 335) or barrel shifter 311.

DETAILED DESCRIPTION

This invention details the use of a novel DDS structure using a barrel shifter coupled to a multiplexer structure within a specially programmed FPGA to reduce the internal operating frequency of DDS storage. This reduces the need for high quality, high $f_t$ switching transistors forming the DDS memory, as well as reducing the power consumption related thereto. For $\Delta\Sigma$ DDS, the invention uses a 3 bit DAC instead of a prior art typical 1 bit DAC, while minimizing increases in the size, and speed of the internal RAM. In prior art applications, digital output waveforms presented to the DAC are pre-computed in external, system processors, and downloaded into RAM. Because digital data has to be read out directly from RAM to the DAC for waveform synthesis, a fast RAM, typically without wait states, is used. The speed of the RAM places a limit to conversion speed in the prior art.

Figure 1:
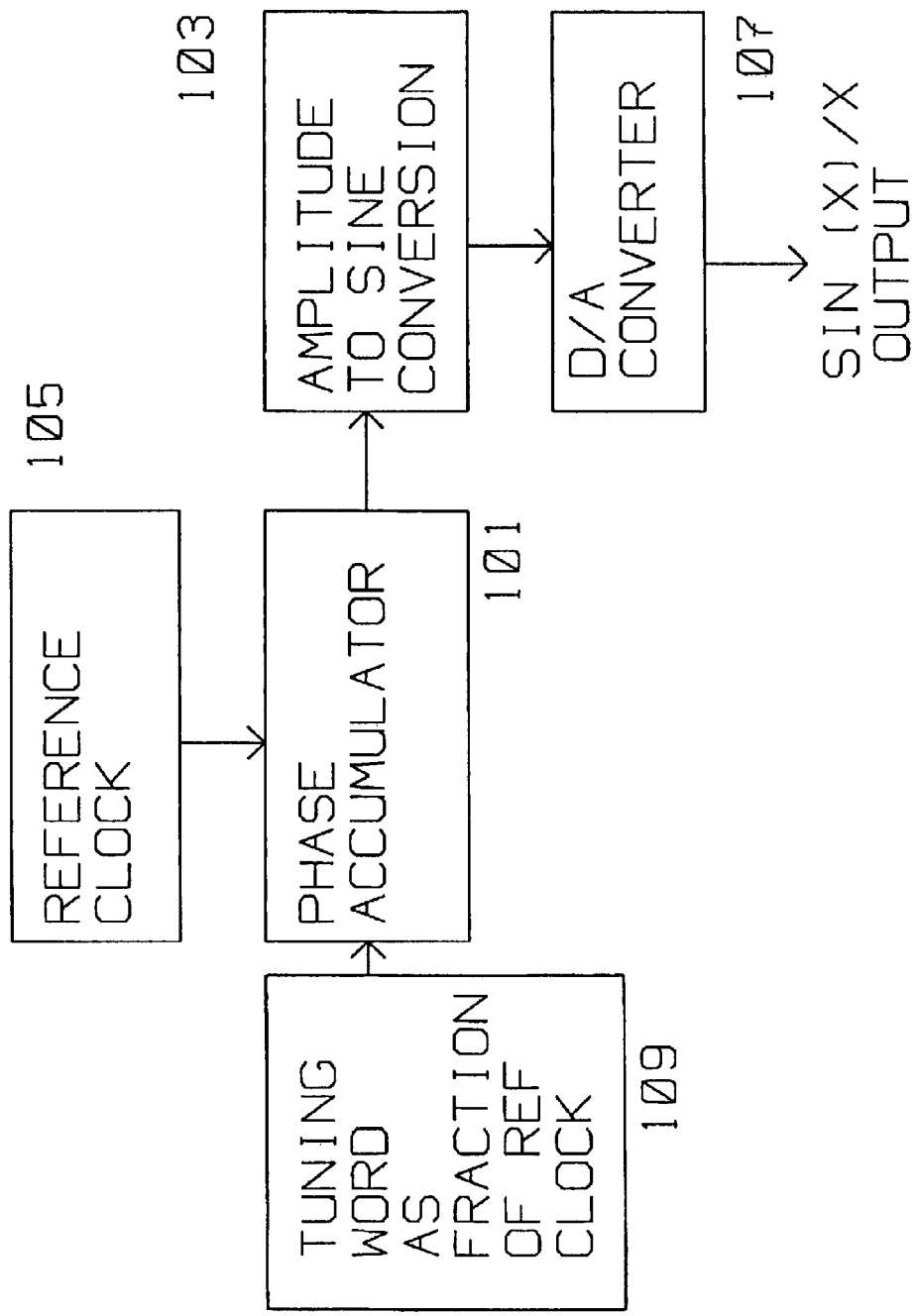
FIG. 1 is an exemplary DDS of the prior art.

Shown in FIG. 1, and typical of the prior art, is a DDS comprising a phase accumulator 101, amplitude to sine converter 103, reference clock 105, and D/A converter 107.

Phase accumulator 101 receives as an input a digital tuning word 109 specifying the output frequency to be generated as a fraction of the reference clock frequency. The operation of a prior art digital signal processor is detailed in *A Technical Tutorial on Digital Signal Synthesis* published by Analog Devices and incorporated herein in its entirety by reference.

Amplitude/Sine wave converter 103 converts a truncated version of the phase accumulator output from phase accumulator 101 by adding non-linearities descriptive of, for example, a sine wave. As shown, the phase accumulator 101, as well as Amplitude/sine conversion converter 103 operate at the frequency of reference clock 105.

Figure 2:
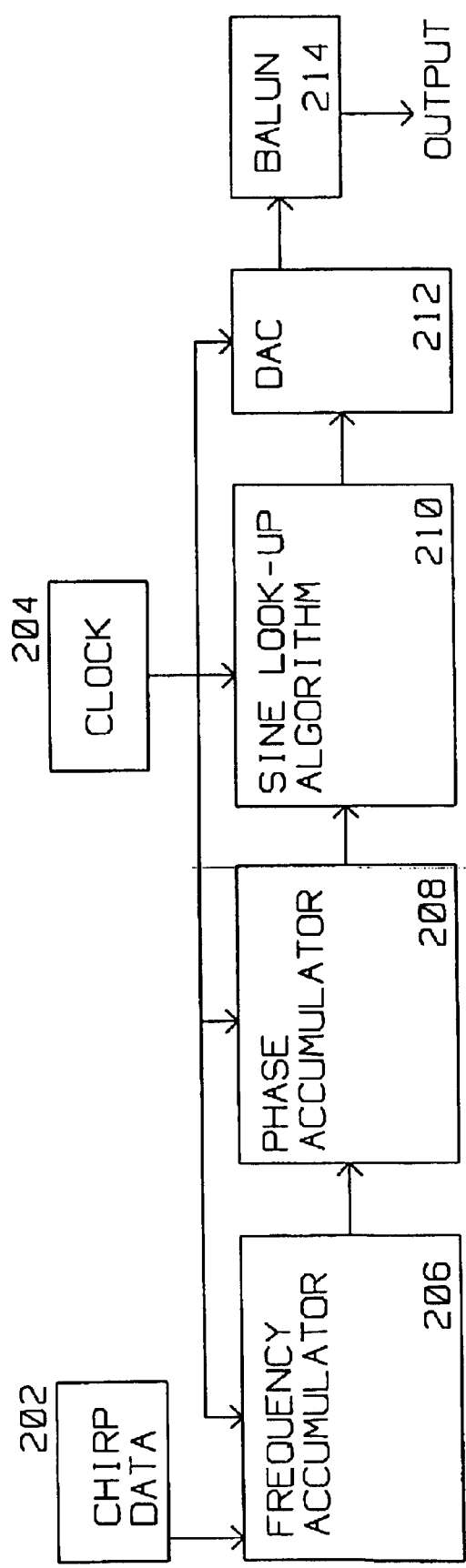
FIG. 2 is an exemplary chirp generator of the prior art using DDS structures.
Figure 2:
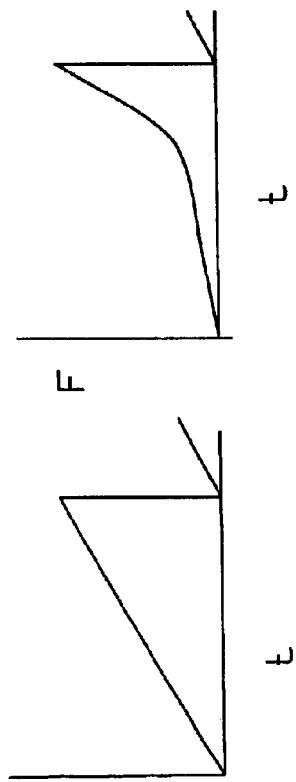

FIG. 2 shows a typical DDS of the prior art used to generate a chirp waveform. A chirp waveform refers to an analog signal where frequency modulation of the output increases as a function of time. Typically chirp type signals are used to code Linear Frequency Modulated radar pulses and decode the returns obtained therefrom. In FIG. 2, digital chirp data 202 is fed into frequency accumulator 206. Frequency accumulator 206 generates an increasing frequency signal F as a function of time t in response to chirp data 202. The output from frequency accumulator 206 is integrated in Phase Accumulator 208. Towards the end of the integration interval, the rate of frequency change is relatively high. The digital words generated by phase accumulator 208 are converted to their sine equivalent in sine lookup algorithm 210. The emerging digital words from sine lookup algorithm are used by digital to analog converter 212 to synthesize an analog output having Sin(x)/I characteristics. Balun 214 eliminates excess harmonics from the Sin (x)/I output. Clock 204 governs the conversion rate of chirp data 202 into an analog frequency chirp output. For good fidelity of analog output, the clock rate of clock 204 has to be sufficiently high to support large frequency changes per unit time generated by phase accumulator 208, typically towards the end of the integration cycle.

Figure 2A:
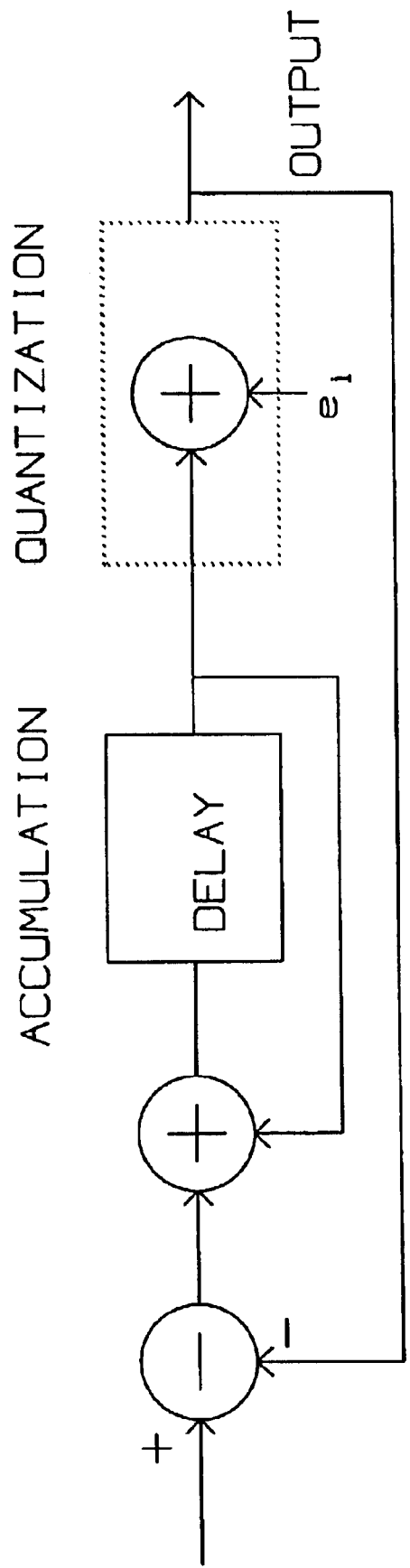
FIG. 2A is another exemplary DDS of the prior art.

The structure of FIG. 2 can also be implemented as a $\Delta\Sigma$ data converter. Such an implementation is shown in FIG. 2A. The principle of operation is detailed in *Delta—Sigma data converters*: theory design and simulation edited by Steven R Norsworthy, Richard Schreier and Gabor C. Temes; IEEE Circuits and Systems Society, sponsor, 1997, ISBN 0-7803-1045-4, incorporated herein in its entirety by reference.

The structure shown in FIG. 3, FIG. 4, FIG. 5, FIG. 6 and FIG. 7 depict the present invention. Unlike the prior art, the present invention pre-computes the digital values for the DDS output waveform, stores it, and presents it for conversion using a barrel shifter. Internally, the extraction of the digital values from storage (typically a RAM 335) is performed at a fraction of the clock frequency of the prior art. NCO 315 also provides digital values defining the output waveform to be transferred to D/A 329 via barrel shifter 311. In this structure, the digital signal portion runs at a reduced clock rate, e.g. clock rate/16 for this particular example. As shown, most of the components related to this system fit within Field Programmable Gate Array (FPGA) 347. The operating frequency of the elements forming the invention is reduced substantially as compared to the prior art. This lower frequency allows FPGA 347 to conveniently house the circuitry.

Figure 7:
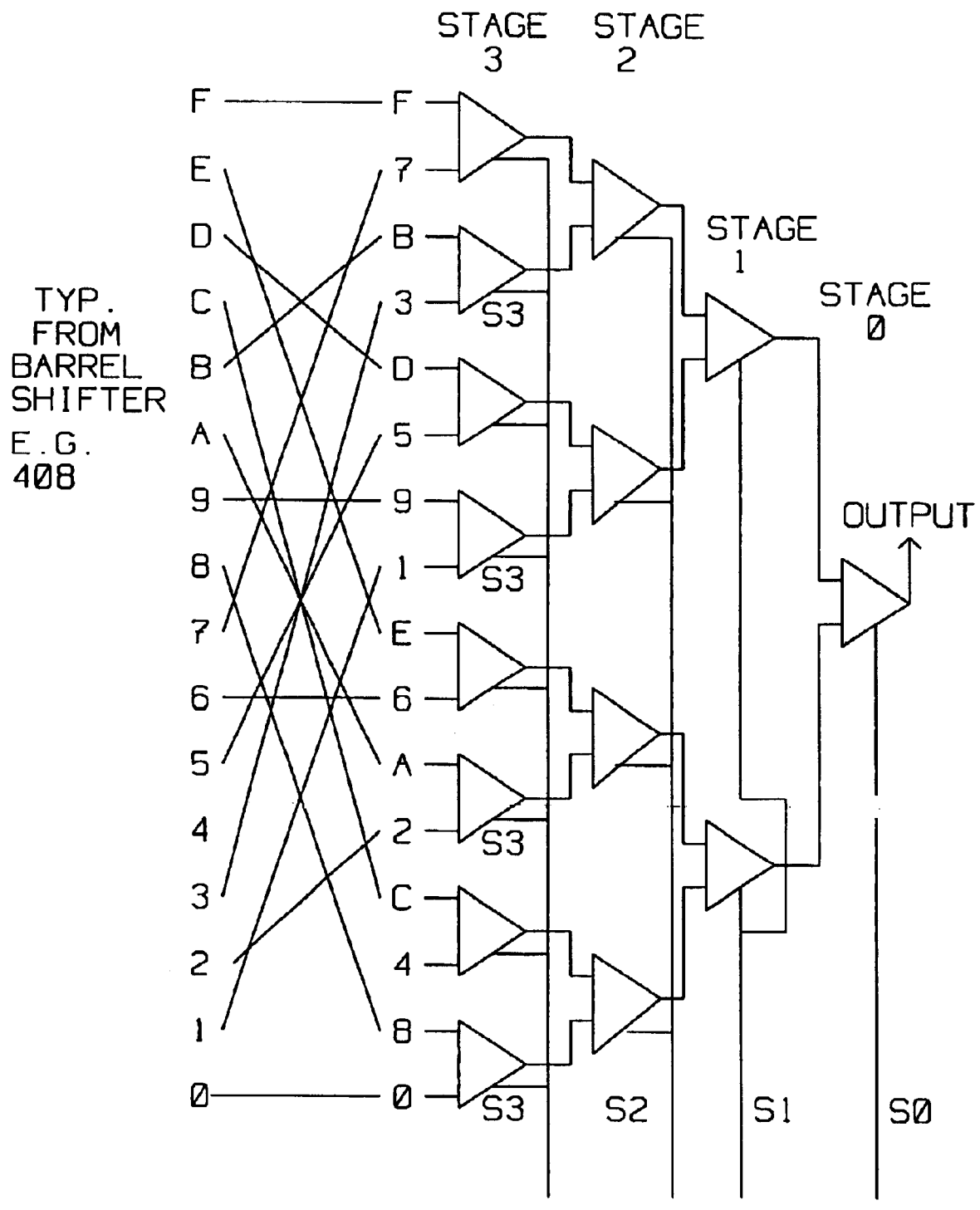
FIG. 7 shows the circuit applicable to an exemplary 16 bits emerging from a barrel shifter to a 16:1 multiplexer of this invention for use by a 3 bit digital to analog converter.

The direct digital synthesizer of this invention is for generating an analog output, a sinusoidal waveform having a a variable frequency within a time duration. Considering FIG. 3 and FIG. 4, the main components of the DDS are:
  a 3 bit numerically controlled oscillator (NCO) 315 for computing some of the required digital values defining the output waveform;
  a memory (402, 404, 406, 335) for storing pre-computed digital values defining the output sinusoidal waveform;
  a bus exchange switch 309 for steering digital values from and to NCO 315, storage 335, and connecting to barrel shifter 311;
  barrel shifters (311, 408, 410, 412) adapted to reading contents of memory (402, 404, 406 or 335) and for presenting the digital values from the memory in sequence to an input of multiplexers (323, 325, 327, 416, 418, 420) at a first rate determined by a a first clock (428, 426, 424, 422, 333). The multiplexers (416, 418, 420) have outputs connected to a Digital to Analog converter (D/A) (329, 432). D/A (329, 432) converts the digital values presented by the multiplexing mechanism (416, 418, 420, 26 323, 325, 327) to the analog output at a second rate determined by a second clock (331, 430). The first clock rate is lower than the second clock rate. In this example, the first clock (430, 331) is divided down by a factor of two in dividers 428, 426, 424 and 422, for a total reduction factor of 16. The reduced rate clock is delivered to various stages within 16:1 multiplexers 416, 418, 420, as shown in FIG. 7.

Barrel shifter 311, having a plurality of 16 bit barrel shifters 408, 410, 412 in this example, shifts the digital values from memory 335 (402, 404 and 406 in FIG. 4) using pipelines and n-bit wrap-around registers. An example of the n-bit wrap around registers used in a single stage of a 16 bit barrel shifter is shown in FIG. 5. FIG. 5 shows a typical 16 bit barrel shifter stage having 16 D type registers in Col A interconnected as shown to 16 separate 2:1 multiplexers. The output of the 16 multiplexers are connected to 16 D type registers in column B. On each $\frac{1}{16}$ clock cycle from clock divider 333, 434 the bits contained in the registers of column A are transferred to the 2:1 multiplexers and then to column B. In effect the data is rotated within the 16 bit barrel shifter. The 16 bit barrel shifters 408, 410 and 412 take waveform data input with justification to bit 0 and positions it by rotation along with all other bits within the barrel shifter. By rotation, bit 0 is placed at any of 16 output positions 0 to F. The address is pipelined along its data. The pipelining is internal to address recoder 414.

Pre-computed digital values defining the sinusoidal waveform are stored within memory 335. Some of the pre-computed digital values are generated using an accumulator based numerically controlled oscillator 315. Others are pre-computed using a simulation of a $\Delta\Sigma$ modulator 337 using an Accumulator based NCO image from NCO 315 in FPGA 347, definitions for a $\Delta\Sigma$ modulator 343 and phase codes 345. A MATLAB Software Multi Bit $\Delta\Sigma$ Modulator 343 within 337 generates, for example, the Least Significant Bit (LSB). (For more bits, the same software can generate the necessary bits.) For this example, a first order Feedback Quantizer will limit the error to within 1 bit. As in the prior art, a 1-Bit, $\Delta\Sigma$ phase coding may optionally phase modulate the output of the $\Delta\Sigma$ modulator. This "modulated data" is either subtracted as shown in subtract 602, in FIG. 6, to the "unmodulated data" from output put from the NCO. Note that the add function 339 is the inverse operation of the subtracting operation.

Figure 6:
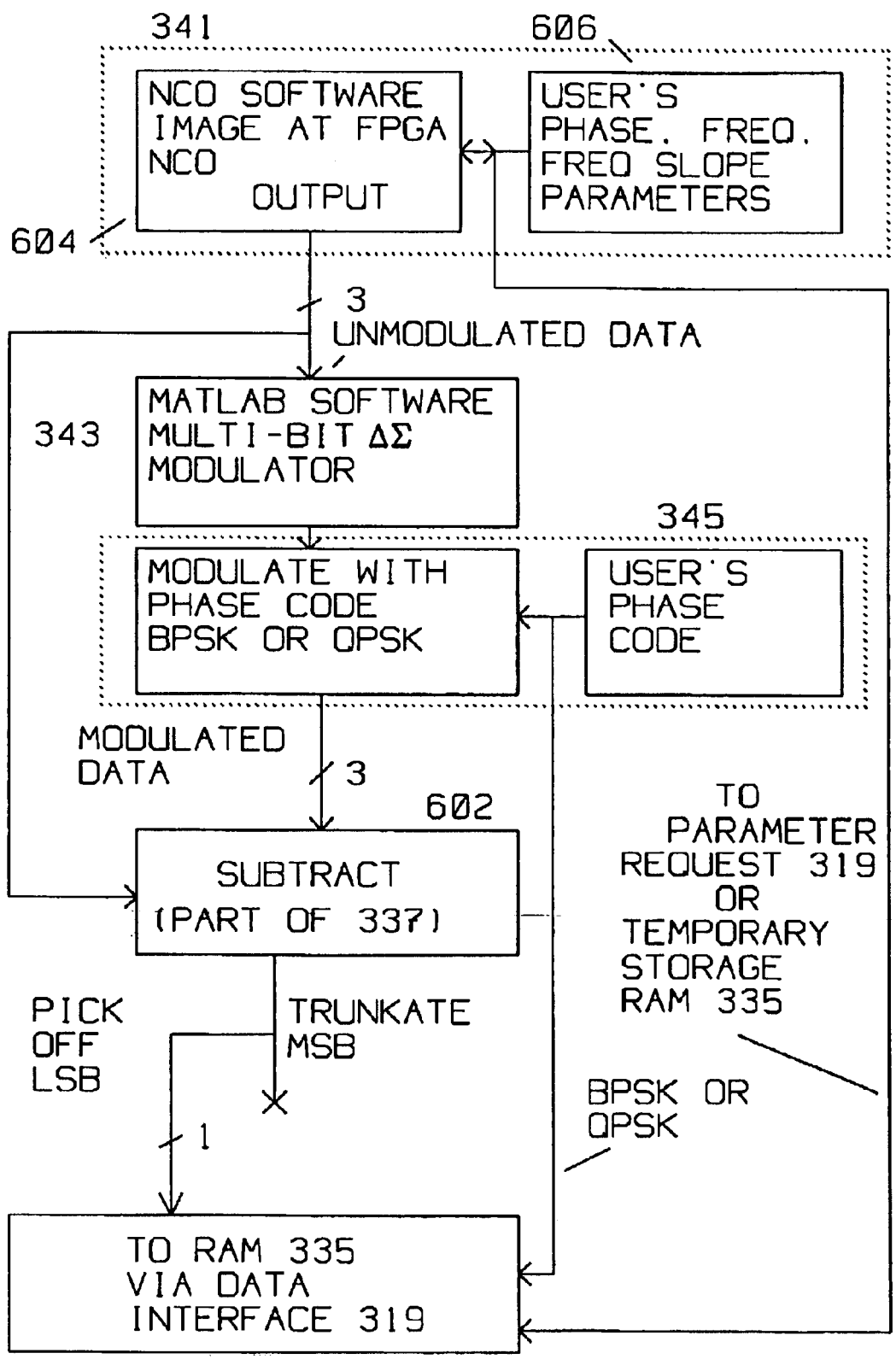
FIG. 6 shows the software flow for pre-computing digital quantities to be pre-loaded into storage associated with this invention.

Only the LSBs are picked off, per FIG. 6, from the results of software subtract 602 function since the 3 bit amplitude can be reconstructed in FPGA 347. Because of this, the memory storage (RAM) 335 only need store the LSB, NCO parameters and optional phase codes, representing fewer bits than the prior art. As further shown in FIG. 6, NCO software 604 in 341 synthesizes the desired waveform, for example a sine wave, using users parameters 606. Users parameters 606 are also sent to RAM 335 for use during subsequent steps using data interface 319. The NCO sine wave, (or chirp) waveform output data is sent to MATLAB software 343 and subtract 602 functions.

Timing and control 321 supplies addressing to RAM 335 and barrel shifter 311. The barrel shifter is required for random access across the 16 bit bits supplied to 16:1 multiplexers 323, 325, and 327 because the multiplexers are unable to make random access transitions across the 10 bit wide input (3 bits deep, 323, 325, 327). Barrel shifter 311 makes up for random access capability of the 16:1 Multiplexers by rotating the bits as shown in FIG. 5 and shifting their order as shown in FIG. 7.

Figure 3:
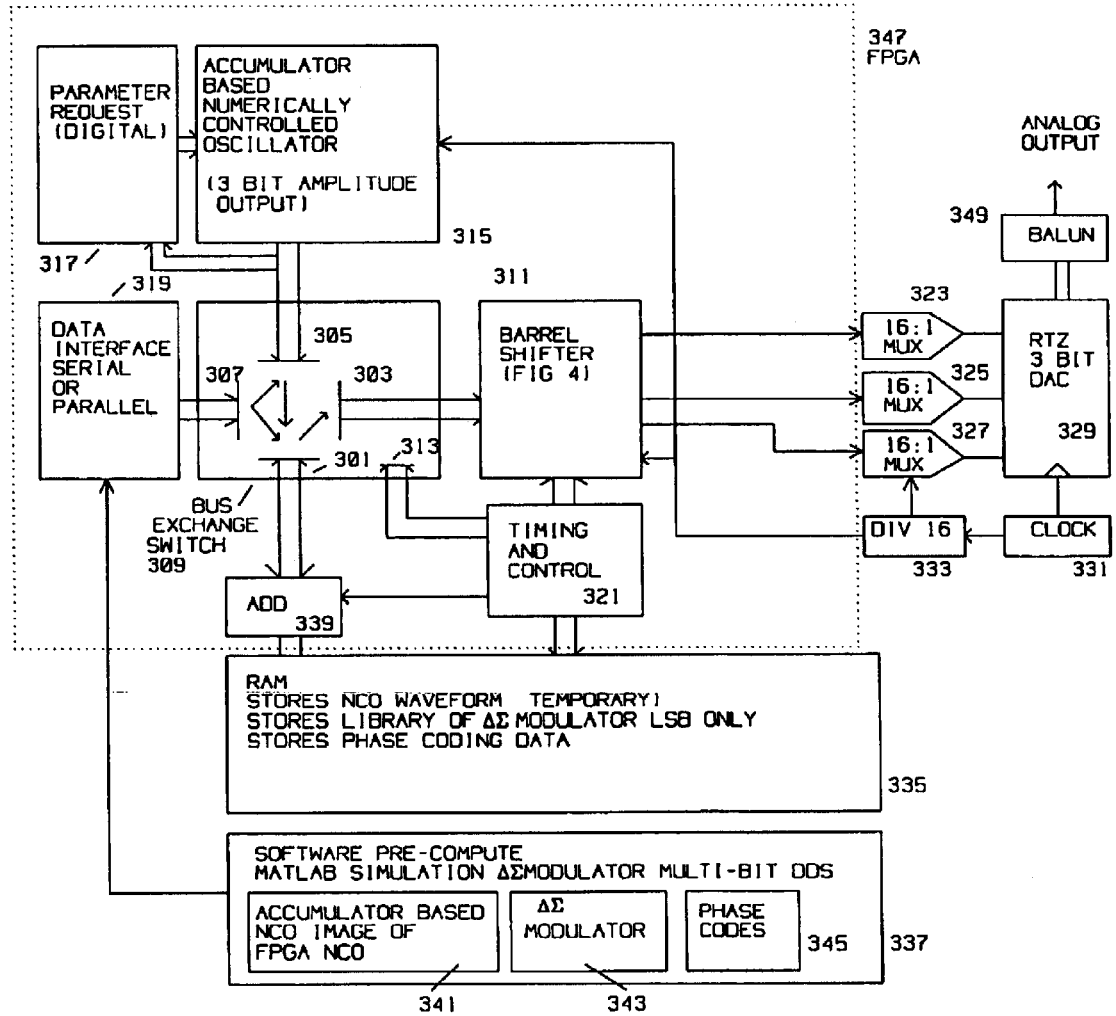
FIG. 3 is a DDS of the present invention using a barrel shifter.

In FIG. 3, Bus exchange switch 309 has five poles. Pole 301 connects from RAM 335 within bus exchange switch 309. Pole 303 connects to barrel shifter 311. Pole 305 connects accumulator based numerically controlled Oscillator 315 (3 bit). Pole 307 connects to the data interface 319. Pole 313 connects to timing and control 321.

The NCO parameters computed by NCO 315 are either transferred from pole 305 to pole 303 and barrel shifter 311, or passed to pole 301 for storage in memory 335.

The LSB of modulation data from Software Compute 337, as described in FIG. 6, is stored in RAM 335 along with phase coded data. Timing and control block 321 synchronously reconstructs the ΔΣ (optionally phase) modulated waveform. This reconstruction is done by synchronously starting waveform synthesis in NCO 315 via bus exchange switch 309. NCO 315 output is obtained via switch 309, pole 305 then pole 301, then barrel shifter 311. Timing and control 321 then looks up the (optional) phase coding, if any, and LSB of modulation data and adds these vectors in ADD 339. Bus exchange switch 309 streams this data from pole 301, routing it to pole 303, to barrel shifter 311.

Figure 4:
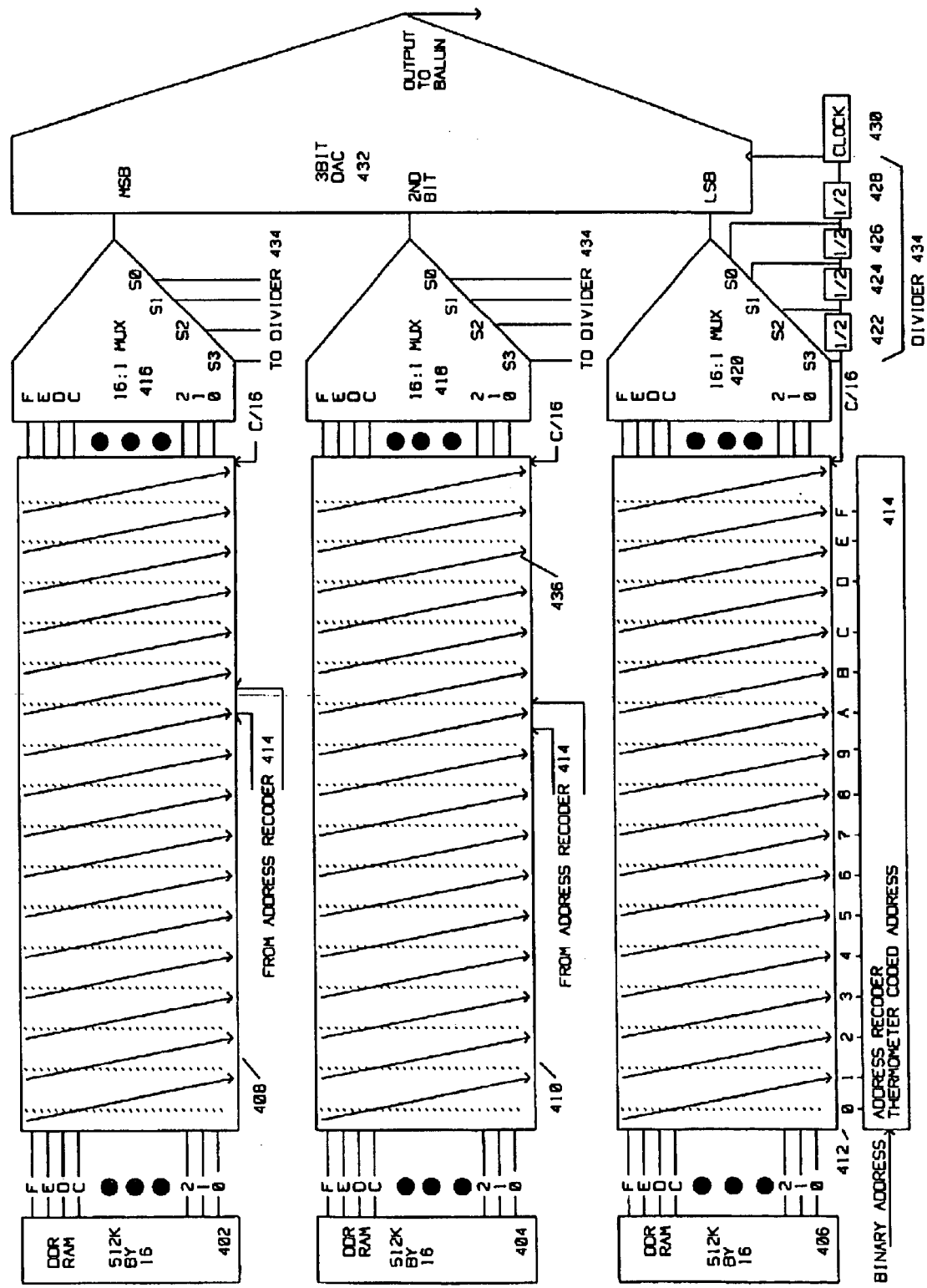
FIG. 4 is a detail of the barrel shifter used in this invention.
Figure 5:
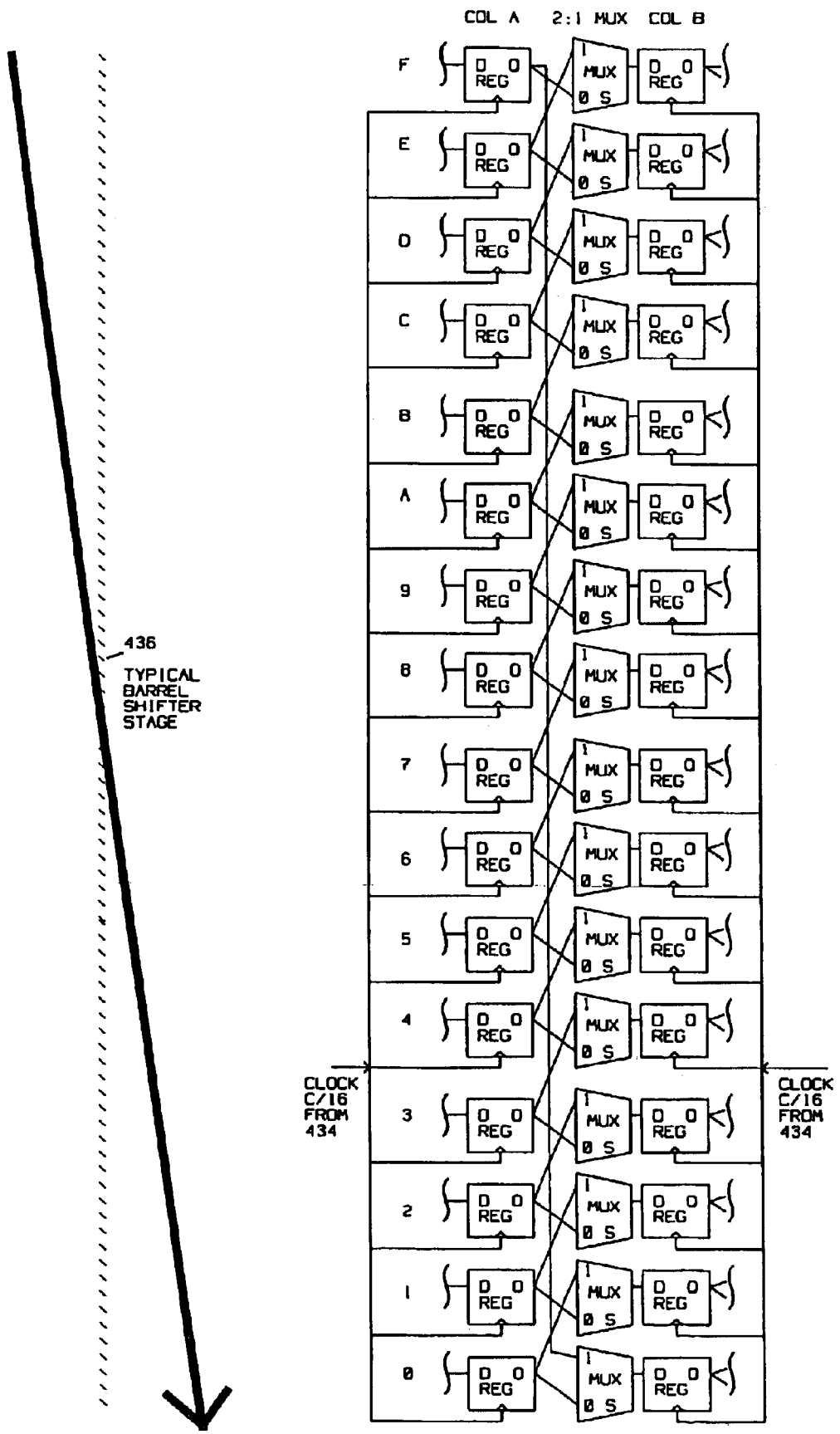
FIG. 5 shows one 16 bit shifting element used in the barrel shifter of this invention.

FIG. 4 further details the operation of the barrel shifter and the interface to memory 402, 404 and 406. FIG. 4 illustrates the case where bus exchange switch 309 in FIG. 3 connects RAM 335 to barrel shifter 311. On each clock cycle, barrel shifter 408 takes the a bit from RAM 402 (for example a 16 by 512K module) and moves it down one position in accordance with FIG. 5. Upon doing so, the output of barrel shifter 408 changes to store output 0, 1 . . . F. It is understood that memory 402, 404 or 406 can be part of storage 335, depending on how bus exchange switch 309 is configured, and whether buffered operation of barrel shifter 311 is desired.

FIG. 7 shows a typical 16:1 multiplexer used in this example and applicable to multiplexers 416, 418 and 420. Barrel shifter 408 has output 0 to F at a particular clock cycle. These outputs are re-routed as shown as inputs to stage 3. Stage 3, having 8 input registers, operates off clock supplied from clock divide 434, the S3 part, which is 1/16 of clock 331. Similarly, stage 2 operates off the divide by 8 portion 424 of divider 434. Stage S1 operates off the divide by 4 portion 426 of divider 434. S0 operates off the divide by 2 portion 428 of divider 434.

The method of the invention for generating an analog output using a direct digital synthesizer comprises the steps of:
  a) loading into a memory pre-computed digital values defining a sinusoidal waveform. These can be computed either by a 3 bit NCO or simulation software such as can b obtained from MATLAB.
  b) reading from said memory said pre-computed digital values into a barrel shifter;
  c) using the barrel shifter to rotating said pre-computed digital values to obtain rotated values;
  d) presenting said rotated values obtained from said memory to an input of a multiplexer at a first rate determined by a a first clock;
  e) multiplexing the rotated values using a multiplexer having an output connected to a Digital to Analog converter, said Digital to Analog converter converting said digital values presented by said multiplexer to said analog output at a second rate determined by a second clock.

Routing of pre-computed digital values from/to memory 335, or NCO, to said barrel shifter 311 is performed using a bus exchange switch.

All references cited in this document are incorporated herein in their entirety by reference.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

What is claimed is:

1. A direct digital synthesizer for generating an analog output, said analog output is a sinusoidal waveform having a variable frequency within a time duration, comprising:
  a memory for storing pre-computed digital values defining said sinusoidal waveform;
  a barrel shifter for reading contents of said memory and for presenting said digital values from said memory to an input of a multiplexer at a first rate determined by a first clock;
  said multiplexer having an output connected to a Digital to Analog converter, said Digital to Analog converter converting said digital values presented by said multiplexer to said analog output at a second rate determined by a second clock.

2. A direct digital synthesizer of claim 1 wherein said first rate is lower than said second rate.

3. A direct digital synthesizer of claim 1 wherein said barrel shifter shifts said digital values using a plurality of pipelines and n-bit wrap-around registers.

4. A direct digital synthesizer of claim 1 wherein said pre-computed digital values defining said sinusoidal waveform are pre-computed and stored within said memory during said duration.

5. A direct digital synthesizer of claim 4 wherein some of said pre-computed digital values are pre-computed using an accumulator based numerically controlled oscillator.

6. A direct digital synthesizer of claim 4 wherein some of said pre-computed digital values are pre-computed using a simulation of a ΔΣ modulator.

7. A direct digital synthesizer of claim 4 wherein said digital values are routed from a storage means using a bus exchange switch (309).

8. A method for generating an analog output using a direct digital synthesizer said analog output is a sinusoidal waveform having a variable frequency within a time duration, comprising the steps of:
  loading into a memory pre-computed digital values defining said sinusoidal waveform;
  reading from said memory said pre-computed digital values into a barrel shifter;
  rotating said pre-computed digital values within said barrel shifter to obtain rotated values;
  presenting said rotated values from said memory to an input of a multiplexer at a first rate determined by a first clock;
  multiplexing said rotated values using a multiplexer having an output connected to a Digital to Analog converter, said Digital to Analog converter converting said digital values presented by said multiplexer to said analog output at a second rate determined by a second clock.

9. A method as described in claim 8 further comprising the step of routing said pre-computed digital values from said memory to said barrel shifter using a bus exchange switch.

* * * * *